US007204346B2

(12) United States Patent
Kurtz et al.

(10) Patent No.: US 7,204,346 B2
(45) Date of Patent: Apr. 17, 2007

(54) SELF CHECKOUT SYSTEM WITH AUTOMATED TRANSPORTATION CONVEYOR

(75) Inventors: Chuck Kurtz, Jacksonville Beach, FL (US); Gary E. Desjardins, Jacksonville Beach, FL (US); Steven J. Sanchez, St. Mary's, GA (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 10/608,629

(22) Filed: Jun. 27, 2003

(65) Prior Publication Data

US 2005/0006176 A1   Jan. 13, 2005

(51) Int. Cl.
*A63F 9/02* (2006.01)
(52) U.S. Cl. .......................... 186/59; 186/60; 186/69; 235/383; 705/16; 705/21; 198/464.1
(58) Field of Classification Search .. 198/464.1–464.3; 186/59–69; 235/383, 385; 705/16–25
See application file for complete search history.

(56) References Cited

U.S. PATENT DOCUMENTS 5,420,606 A * 5/1995 Begum et al. .............. 345/156
5,543,607 A * 8/1996 Watanabe et al. ........... 235/383

* cited by examiner

*Primary Examiner*—Patrick Mackey
*Assistant Examiner*—Jeffrey A. Shapiro
(74) *Attorney, Agent, or Firm*—Duke W. Yee; Mark E. McBurney; Mark Adams-Moe

(57) ABSTRACT

A system and method for transporting items along a conveyor for a checkout system may include starting a conveyor in a transporting direction upon an item being placed in proximity to a start sensor, transporting the item beyond the start sensor and stopping the conveyor prior to the item reaching an end of the conveyor if a checkout sensor positioned in a checkout area indicates that a user is absent at the checkout area. The system and method may further include transporting the item toward the end of the conveyor if the checkout sensor indicates a user is present at the checkout area, transporting the item toward the second end of the conveyor upon a second item being placed in proximity to the start sensor and stopping the conveyor upon the item being sensed by a stopping sensor.

18 Claims, 5 Drawing Sheets

SELF CHECKOUT SYSTEM WITH AUTOMATED TRANSPORTATION CONVEYOR

FIELD OF INVENTION

The present invention relates generally to self-service checkout systems. More particularly, the present invention relates to a self-service checkout system having a powered item transportation/conveyor belt leading to an item processing and tendering module.

BACKGROUND OF INVENTION

The retail merchandiser, drugstore and supermarket industries have placed an impetus on reducing labor costs. Additionally they have expended energy in a variety of different ways to reduce or eliminate the amount of time required to process items to be purchased by a customer. To this end, there have been a number of self-service checkout system concepts developed which attempt to substantially eliminate the need for a checkout clerk. A self-service checkout system permits a customer to process and pay for their purchase with little or no retailer personnel assistance. Self-service has benefited consumers and retailers alike. Such systems have been widely adapted for purchasing gasoline at self-service service stations and are now becoming more available in retail stores. Self checkout models have a variety of features and benefits designed to make the self checkout process fast and easy. A variety of scanning and bagging (scan and item and place immediately in a bagging area) and scan and pass (scan an item and place it on a belt which transports the item to a bagging area) have been introduced into the retail checkout market.

Commonly-assigned U.S. Pat. No. 4,676,343 and U.S. Pat. No. 4,792,018, hereby incorporated by this reference thereto, disclose systems for the automated checkout of articles selected by a customer for purchase in supermarkets and like facilities. The former patent involves an arrangement addressing articles which bear a so-called "universal product code" (UPC), typically in the form of a bar code uniquely indicative of the identity of the article bearing the code. The UPC of each article selected for purchase is scanned or read and a signal indicative of the article identity is generated and applied to a central processing unit (CPU) which has stored in associated memory storage for the UPCs of all articles available for purchase which are so encoded, correlated with the price and other characteristics of the articles, such as weight. Articles are placed on a conveyor following UPC scanning and thereby led into a "security tunnel", which is guarded against customer fraud by various light curtains, which are in the form of light sources and associated photocells. In the course of article conveyance, its weight is physically measured and a signal is generated indicative of the measurement.

Comparison is made of the stored, weight-indicative signal and the physical measured signal. If the comparison is negative, indicative of potential customer fraud, article processing is interrupted and various courses of action are obtainable, one being the reverse movement of the conveyor. Otherwise, in the course of continuing positive comparison results, the customer's order is carried forward, with price totalization effected from stored price-indicative signals.

In the latter patent, items are transported "down stream" from the scanning and payment area through the "security zone" and into a collection area. An additional item transport method is to have the belt positioned "up stream" from the scanning and payment area and place item directly into a secure collection area. Current "up stream" item transport methods require the self service operator to manually press a button to move items into position for scanning.

Current self-checkout systems require that customers scan, pay and bag orders by pulling items directly from a cart or basket and processing them for purchase. Moreover, while attendant only checkout areas include a conveyor at the front of the processing unit to make it easier to unload and stage orders for processing, these systems only allow the transportation of the staged items for processing via depressing of a manual button. This creates inefficiencies since the customer (in the case of a self-checkout system) or an attendant must engage the belt manually.

Placing an input conveyor belt at the front of self checkout station provides easier unloading and processing of items. However, current input belt self checkout systems have an item handling limitation: the input belt is operator controlled. Because such belts do not automatically move items as they are unloaded and scanned, they require manual intervention to position items close enough to the operator to reach them for scanning.

Accordingly, it would be advantageous to provide item transport system and method with a belt positioned "up stream" from the scanning and payment area that automatically moves items into position for scanning and tendering.

SUMMERY OF THE INVENTION

The present invention addresses the problems indicated above and presents methods and systems for transporting unloaded items in a self-checkout or attendant system, from a staging/loading area to a scanning and tendering unit (e.g., processing/checkout area) automatically without manual belt activation by a user. Furthermore, some embodiments of the present invention allow items on the belt to be transported and spaced apart from one another and spaced from the processing area as additional items are placed on the belt. This may be done so that room may be freed-up for additional items to be placed on the belt and spaced apart in anticipation of processing.

In some embodiments of the present invention, the transporting belt moves items forward automatically when a customer is positioned at the scanning and tendering unit. Moreover, items may be moved forward intermittently as items are cleared from the staging area next to the scanning and tendering unit.

As outlined in FIG. 3, which illustrates a method embodiment of the present invention, the system senses items as they are placed on the item transportation/conveyor belt. The belt is activated and then moves the items forward incrementally item by item so as to prevent all the items collecting in one spot on the item transportation/conveyor belt. In addition, the incremental belt movement generated from the unloading of items continues until the system senses the items for purchase have reached the end (the part of the belt closest to the scanning and tendering unit). At this point, the belt stops until the customer has finished unloading their items for processing. Item movement is made possible, for example, through the use of on/off light emitter and detector conditions.

Once items are positioned on the item transportation/conveyor belt, the customer may move to the scanning and tendering unit to continue the transaction. The system may then sense the customer's presence at the scanning and tendering unit and automatically move items toward the customer/processing area for processing and bagging.

The item transportation/conveyor belt may then incrementally move items to the scanning and tendering unit as the customer removes items from the belt until all items are processed. This movement may also take place via a switch or other manual device. Accordingly, a manual on/off switch may be provided in the event a customer wishes to control the belt manually or if an emergency situation should arise (i.e., to turn off the belt).

The invention may be deployed in a number of self service and conventional operation configurations including use as a self checkout only (cash and/or credit payment) and use as a conventional check stand (attendant accepts payment—cash and/or credit).

In one embodiment of the present invention, an apparatus for transporting items for purchase at a checkout location may include a conveyor and a start sensor positioned at a first end of the conveyor. The conveyor transports one or more items upon the start sensor sensing the one or more items. The apparatus may also include a stop sensor positioned at a second end of the conveyor. The conveyor may be stopped upon one or more items being sensed by the stop sensor.

In another embodiment of the present invention, a method for transporting items along a conveyor for a checkout system may include starting a conveyor in a transporting direction upon an item being placed in proximity to a start sensor, transporting the item beyond the start sensor and stopping the conveyor prior to the item reaching an end of the conveyor if a checkout sensor positioned in a checkout area indicates that a user is absent at the checkout area. The method may also include transporting the item toward the end of the conveyor if the checkout sensor indicates a user is present at the checkout area, transporting the item toward the second end of the conveyor upon a second item being placed in proximity to the start sensor and stopping the conveyor upon the item being sensed by a stopping sensor.

In yet another embodiment of the present invention, a self-checkout system may include an apparatus for transporting items for purchase at a checkout location. The apparatus may include a conveyor and a start sensor positioned at a first end of the conveyor. The conveyor transports one or more items upon the start sensor sensing the one or more items. The apparatus may also include a stop sensor positioned at a second end of the conveyor, where the conveyor is stopped upon one or more items being sensed by the stop sensor.

Other embodiments of the present invention may include computer readable media having computer instructions for performing methods according to the present invention as well as application programs for performing such methods.

The embodiments of the present invention will become even more clearer with reference to the drawings included herewith and the following detailed description.

DESCRIPTION OF THE EMBODIMENTS

The preferred embodiments will now be described with reference to the drawings. In its preferred application, the present invention will be described with reference to a self-checkout system. The system is not, however, applicable only to self-checkout, but can be used with manual or conventional lanes in a variety of convenience stores, grocery stores, book and novelty stores, mass merchants, warehouse stores, drug stores or other retail establishments. The system may also be applied to non-retail establishments such as, for example, public libraries.

Figure 1:
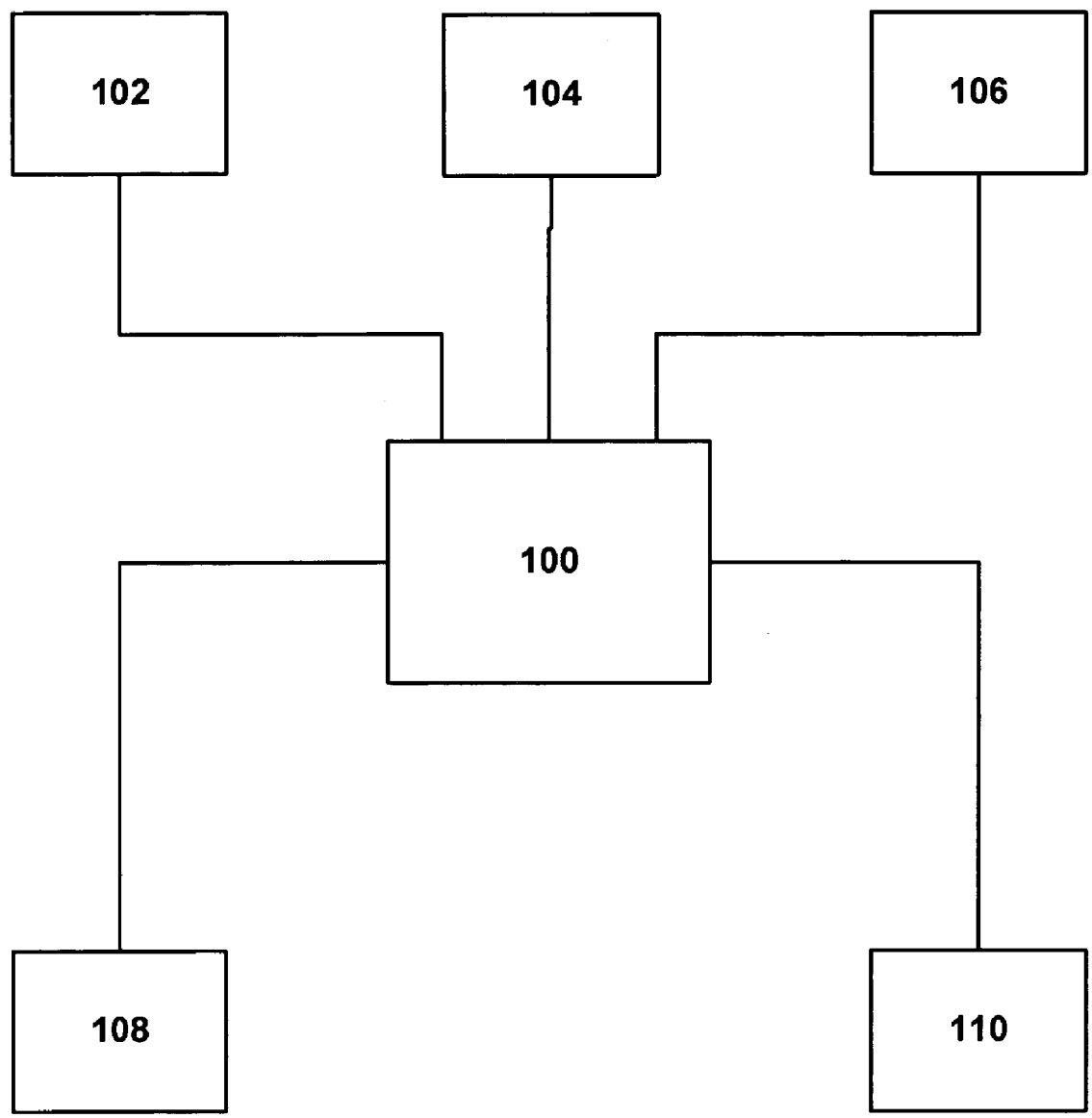
FIG. 1 is a block diagram of components of a system according to another embodiment of the present invention.

Accordingly, as shown in FIG. 1, the system may include a central processing or control unit. Preferably, this unit is a digital control unit 100 which may be a computer or other digital device that processes information digitally. However, other embodiments of the present invention may be controlled through analog systems. The control unit 100 may be the same or included with a central processing unit which conducts and/or controls the shopping transaction. One of ordinary skill in the art will appreciate that one or more peripheral devices may be included with or in communication with the control unit 100 (e.g., display, keyboard, network and the like).

In communication with the control unit are one or more start sensors 102, at least one stop sensor 104, a proximity sensor 106, a manual control switch 108 and an item transportation/conveyor belt 110. Start sensors may be positioned at a the front of the item transportation/conveyor belt and are used to trigger the start of the belt when items are placed in the sensing area (e.g., the sensor is blocked by an item which is placed in the vicinity of the sensor). The stop sensor may be positioned at an end of the belt closest to a checkout/processing area. The stop sensor may be used to stop the belt from moving if it is blocked by an item. The proximity sensor may be used to sense that a customer (or user) is positioned at the processing area, and causes the item transportation/conveyor belt to advance items towards the processing area (i.e., customer blocks sensor). The manual control switch may be used to start/stop the item transportation/conveyor belt in the event the customer/user wants to control the progress of the belt manually or if there is an urgent need to stop the belt.

The sensors may comprise, for example, light activated sensors (e.g., infrared and the like), as well as any other sensor which may be used to indicate that an object has been placed in a vicinity of the sensor (e.g., weight sensor, radar, and the like).

Figure 2:
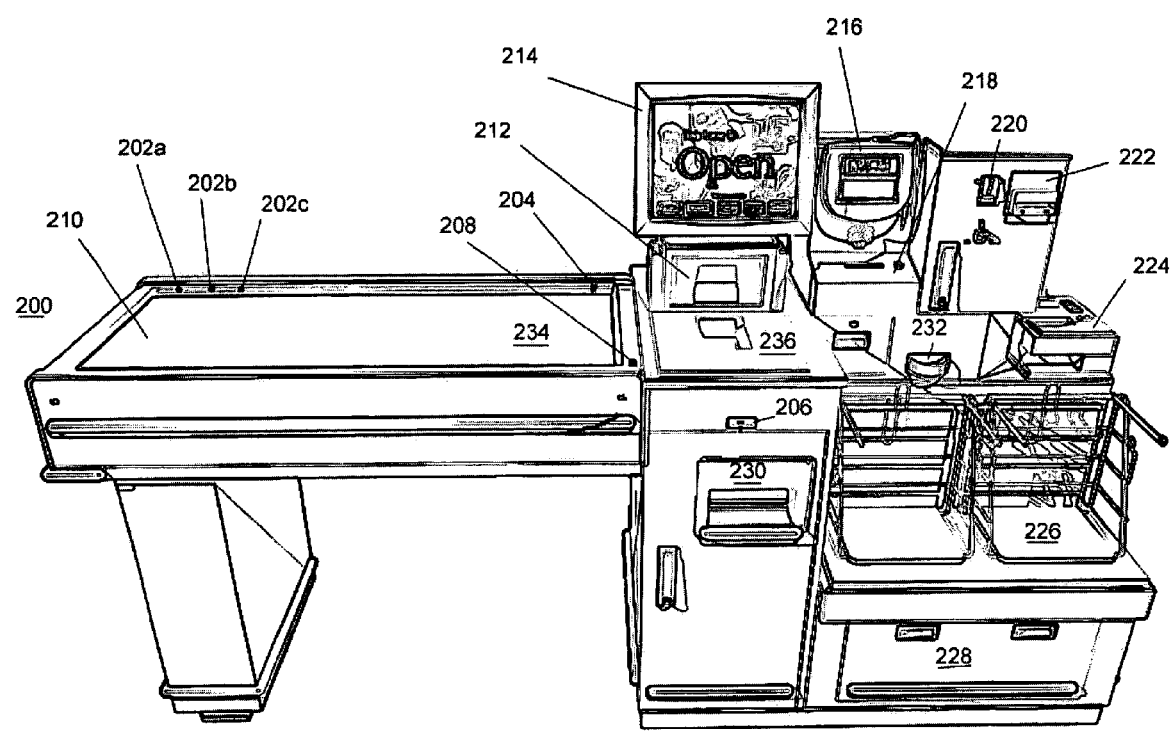
FIG. 2 illustrates a system according to an embodiment of the present invention.
Figure 3:
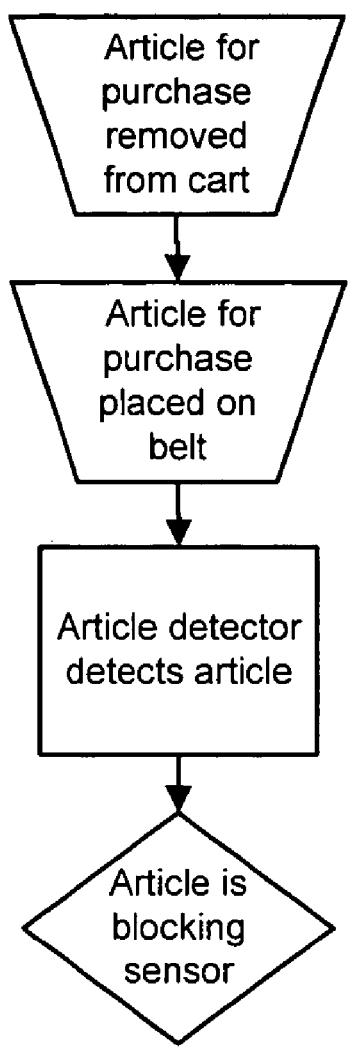
FIG. 3 illustrates a flowchart of a process according to one embodiment of the present invention.

A positioning of these items in a self-checkout system is shown in FIG. 2. As illustrated, start sensors 202*a*, 202*b* and 202*c* are positioned at the starting end 200 of a transportation/conveyor belt 210. Stop sensor 204 may be positioned at an end 234 of the item transportation/conveyor belt 210 The self-checkout system may also include processing/scanning area 236, which may include a proximity/processing sensor 206. The manual on/off switch 208 for the item transportation/conveyor belt may be positioned between the end 234 of the conveyor and the processing area 236. The system may also include a scanner scale 212, a monitor 214, an electronic payment pin-pad 216, a coupon acceptor 218, a coin acceptor 220, a bill-currency acceptor 222, a receipt and/or coupon printer 224, a security scale bagger 226, a processor/control housing 228, a bill-currency dispenser 230 and a coin-dispenser 232.

Although the self-checkout system does not include additional conveyors to transport items away from the processing/checkout area of the system, one of skill in the art will appreciate that the present invention may be used with such checkout systems. Examples of such systems are illustrated in U.S. Pat. Nos. 4,676,343 and 4,792,018.

Figure 4:
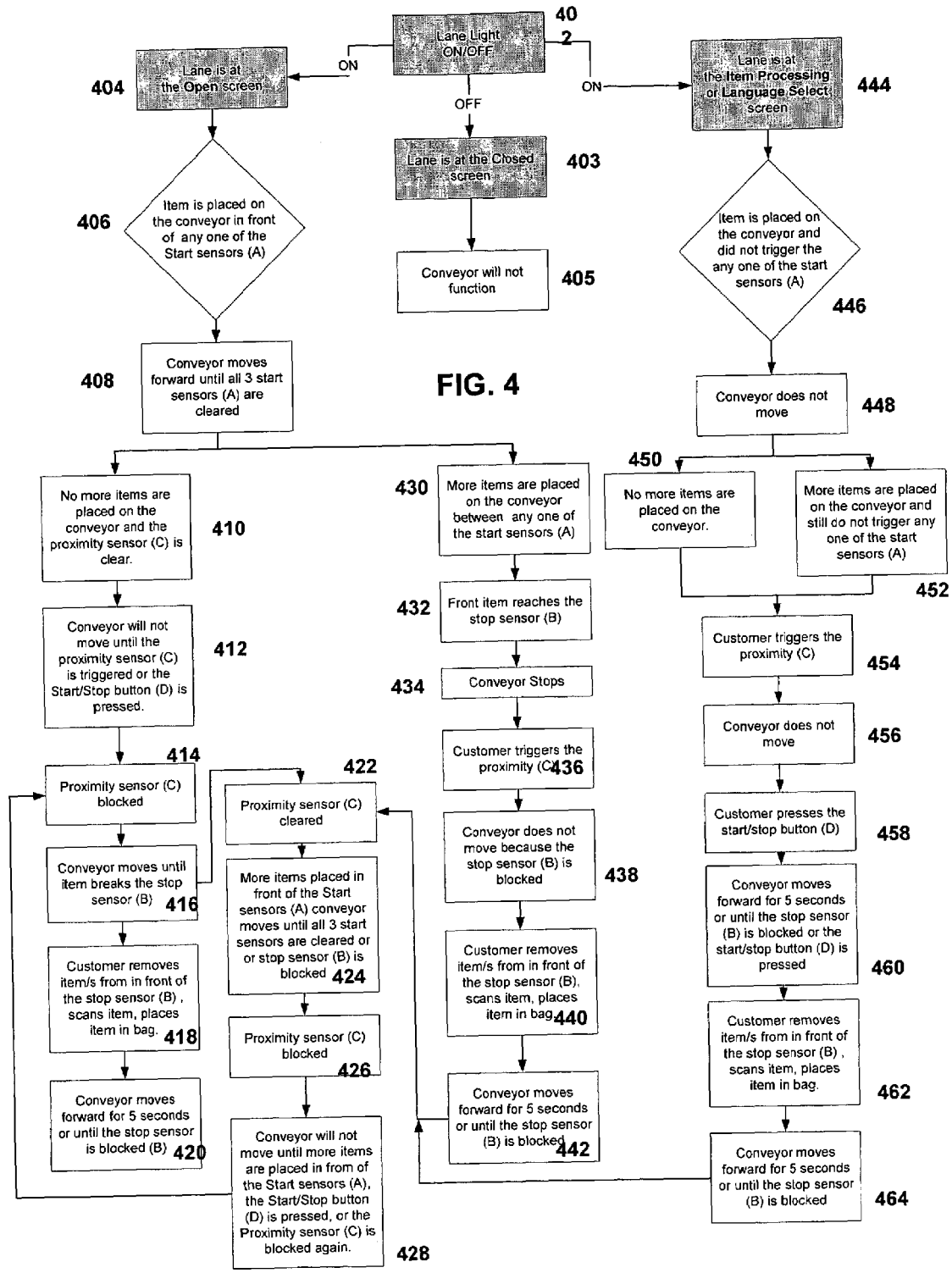
FIG. 4 illustrates a flowchart of a process according to another embodiment of the present invention.

FIG. 4 illustrates methods of operation of some embodiments of the present invention. Accordingly, a customer approaches a self-checkout system/lane. Upon the self-checkout system/lane being open (lane light ON)(402, 404), an item is placed by a customer on the item transportation/ conveyor belt in front of one or more of the start sensors (406)(closed lane-see steps 403, 405). The sensors provide signals to the control unit to start the conveyor and transport the items forward until all three start sensors are cleared (408). If no additional items are placed on the item transportation/conveyor belt and the proximity senor is clear, the conveyor remains stopped. The conveyor may move upon the proximity sensor being triggered (by the customer) or the manual switch for the item transportation/conveyor belt being activated (410, 412).

Accordingly, when the proximity sensor is blocked, indicating that the customer is positioned at the processing area, the item transportation/conveyor belt moves until an item on the conveyor blocks the stop sensor (414, 416). The customer removes items which block the stop sensor, scans them and places them in a bag at the security scale bagger (418). When an item which blocks the stop sensor is removed from the item transportation/conveyor belt, the belt moves forward (toward the processing area). The progression of the belt may continue for a predetermined time period (e.g., 5 seconds), or until another item on the belt blocks the stop sensor (420).

If, for example, at step 416, the proximity sensor is clear, indicating that the customer is not at the processing area (422), additional items placed in front of one or more of the start sensors will be transported by the conveyor until, preferably, the item clears all three start sensors, or until an item blocks the stop sensor (424). Even when the proximity sensor is blocked (i.e., a customer is positioned adjacent the processing area), the conveyor may not move until either more items are placed on the conveyor, the manual switch for the conveyor is activated or an item which is blocking the stop sensor is removed from the conveyor. The removed item may then be scanned at the processing area and bagged (see steps 426, 428–442).

Upon the item transportation/conveyor belt not transporting items upon the occurrence of, for example: items placed near one or more of the stop sensors, additional items being placed near the stop sensors, and (for example) the customer blocks (i.e., activates) the proximity sensor, the customer may start the conveyor moving by pressing the manual start/stop switch for the conveyor. This may then start the conveyor moving for, preferably, a predetermined time period (e.g., 2–10 seconds)(see steps 444–464).

Figure 5:
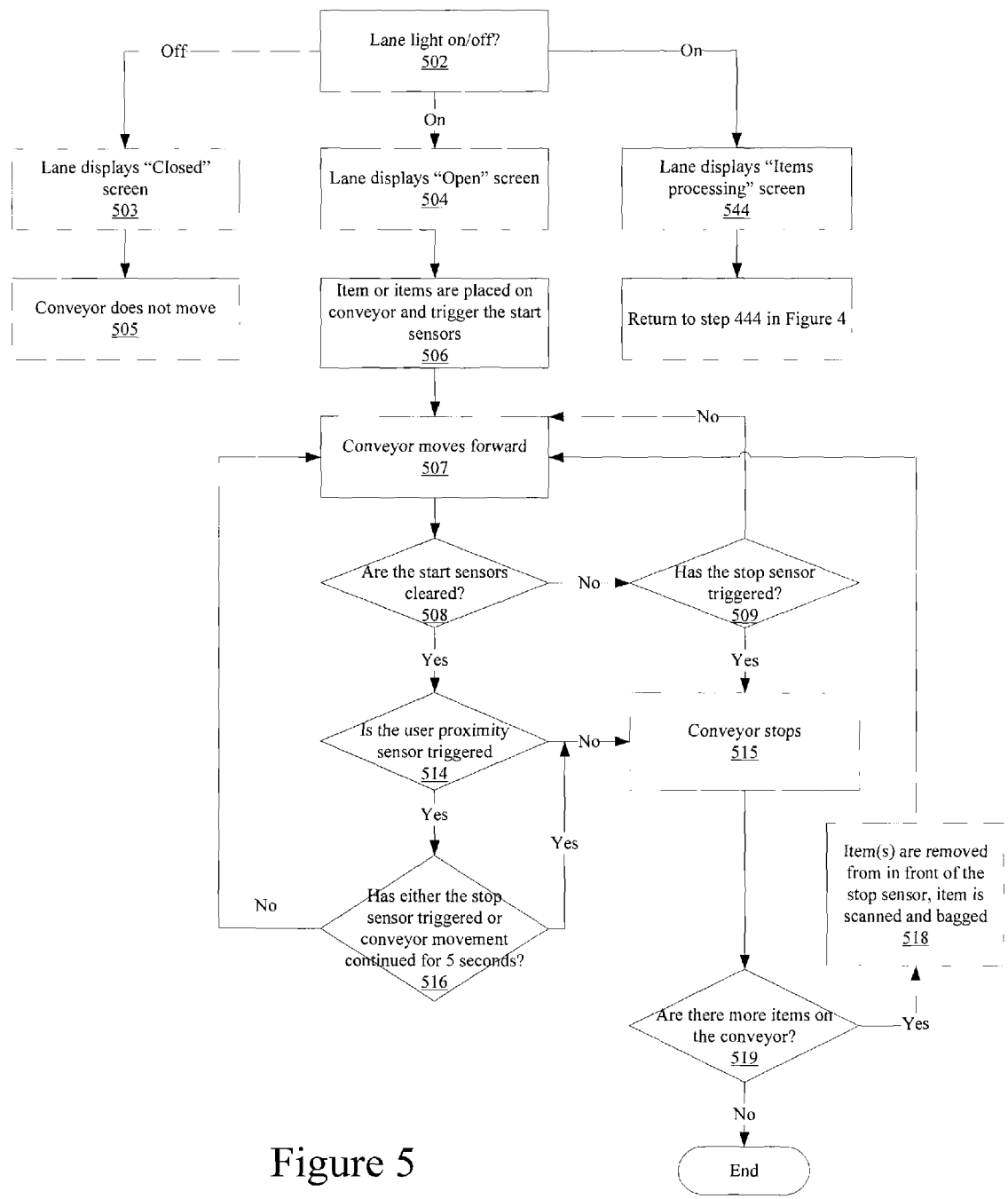
FIG. 5 illustrates a segment of the flowchart depicted in FIG. 4.

Turning now to FIG. 5, FIG. 5 is a segment of the flowchart in FIG. 4. The process begins by determining the status of the self-checkout lane (step 502). If the self-checkout lane displays a "closed" screen (step 503), the conveyor does not move (step 505). If the self-checkout lane displays the "Items processing" screen, then refer to FIG. 4 (step 444).

If the lane displays an "Open" screen, the lane is ready to process items. An item or items may be placed on the conveyor, which may trigger the start sensors (step 506). The conveyor then moves forward (step 507). The process then determines whether the start sensors are cleared (step 508). Cleared start sensors indicate that all the items loaded onto the conveyor have moved forward toward the processing area. In an illustrative embodiment, the items are within reach of a customer positioned to scan the items. The process then checks for a customer in the processing area by determining whether the user proximity sensor is triggered (step 514). If no, there is no customer sensed (no output to step 514), the conveyor stops (step 515). If yes, there is a customer sensed in the processing area (yes output to step 514), then a determination is made as to whether either the stop sensor has triggered or the conveyor movement has continued for longer then 5 seconds (step 516). If yes, either the stop sensor or timer has triggered (yes output to 516), the conveyor stops (step 515). If no, neither the stop sensor nor the timer has triggered (no output to step 516), the conveyor continues forward movement (step 507).

Returning to step 508 if the start sensors are not cleared (no output to step 508), the process determines if the stop sensor has triggered (step 509). If the stop sensor has not triggered (no output to step 509), the conveyor moves forward (step 507). If the stop sensor has triggered (yes output to step 509), the conveyor stops (step 515). When the conveyor stops, the customer may determine whether there is an item on the conveyor to be processed (step 519). If yes, the customer determines there is an item on the conveyor to be processed (yes output to 519), the customer removes the item from in front of the stop sensor, the item is scanned and bagged (step 518). In another embodiment, a store employee may implement the scan and/or bag steps. Once the item is removed, the conveyor continues movement (step 507). If no, there is no item on the conveyor to be processed (no output to step 519), the process ends. Note, that the conveyor may be operated manually. The manual control may start the stopped conveyor and stop the moving conveyor at any time during the process flow.

In one embodiment of the invention, activation of the start/stop switch may "reset" the system such that, for example, the software and hardware driving the system is reset to fix an error that may have occurred therein. Thus, after an initial activation of the start/stop switch, the customer may not need to activate the switch again.

Having now described some of the embodiments of the invention, it should be apparent to those skilled in the art that the foregoing is merely illustrative and not limiting, having been presented by way of example only. Numerous modifications and other embodiments are within the scope of ordinary skill in the art and are contemplated as falling within the scope of the invention. The contents of any references cited throughout this application are hereby incorporated by reference. The appropriate components, processes, and methods of those documents may be selected for the present invention and embodiments thereof.

What is claimed is:

1. An apparatus for transporting items for purchase at a checkout location comprising:

a conveyor having an upstream end for loading at least one item for purchase and a downstream end for processing the at least one item for purchase;

a processing area positioned proximate the downstream end of the conveyor, the processing area comprising a self-scanning area and a bagging area;

a start sensor positioned proximate the upstream end of the conveyor, wherein the conveyor transports the at least one item downstream toward the self-scanning processing area in response to the start sensor sensing the at least one item adjacent to the start sensor, and wherein the conveyor is stopped when the at least one item is no longer adjacent to the start sensor;

a user proximity sensor positioned at the self-scanning area, wherein the user proximity sensor in response to sensing a user causes the conveyor to resume transporting the at least one item towards the downstream end of the conveyor; and a stop sensor positioned proximate the downstream end of the conveyor near the self-scanning area, wherein the conveyor is stopped upon the at least one item being sensed by the stop sensor.

2. The apparatus according to claim 1, wherein the start sensor comprises a plurality of start sensors.

3. The apparatus according to claim 2, wherein the plurality of start sensors are positioned one after the other in a transporting direction at the upstream end of the conveyor.

4. The apparatus according to claim 2, wherein the plurality of start sensors are spaced apart from one another a predetermined distance.

5. The apparatus according to claim 2, wherein a last start sensor of the plurality of start sensors is positioned such that the conveyor is stopped with a last item positioned within an arm's reaching distance of processing area.

6. A method for transporting items along a conveyor in a self-checkout system comprising:

providing a self-checkout system comprising a conveyor having an upstream end for loading at least one item for purchase and a downstream end for processing the at least one item, a processing area comprising: a self-scanning area and a bagging area positioned proximate a downstream end of the conveyor, at least one start sensor positioned proximate the upstream end of the conveyor, a user proximity sensor positioned at the self-scanning area, and a stop sensor positioned proximate to the to the self-scanning area;

commencing downstream movement of the conveyor in response to the at least one start sensor sensing a first item on the conveyor, wherein downstream movement of the conveyor continues until the at least one start sensor does not sense the at least one item;

resuming the downstream movement of the conveyor in response to a user being sensed by the user proximity sensor;

stopping the conveyor in response to the at least one item being sensed by the stop.

7. The method according to claim 6, wherein upon the user being sensed by the user proximity sensor, and upon the at least one item being removed from the conveyor, the conveyor resumes downstream movement for a predetermined time interval or until a subsequent item is sensed by the stop sensor.

8. The method according to claim 6, wherein upon a user being absent from the self-scanning area, the conveyor stops when the at least one item is transported to a position beyond the at least one start sensor.

9. The method according to claim 8, wherein upon a user being absent from the self-scanning area, and wherein a subsequent item is adjacent to the at least one start sensor, the conveyor moves toward the downstream end.

10. The method according to claim 8, where upon a subsequent item reaching the stop sensor, the conveyor stops.

11. The method according to claim 6, wherein upon the conveyor moving in the transporting direction, the conveyor is stopped via a manual switch.

12. A self-checkout system comprising:

a conveyor having an upstream end for loading at least one item for purchase and a downstream end for processing the at least one item for purchase;

a processing area positioned proximate the downstream end of the conveyor, the processing area comprising a self-scanning area and a bagging area;

a start sensor positioned proximate the upstream end of the conveyor, wherein the conveyor transports the at least one item downstream towards the self-scanning processing area in response to the start sensor sensing the at least one item adjacent to the start sensor, and wherein the conveyor is stopped when the at least one item is no longer adjacent to the start sensor;

a user proximity sensor positioned at the self-scanning area, wherein the user proximity sensor in response to sensing a user causes the conveyor to resume transporting the at least one item towards the downstream end of the conveyor; and a stop sensor positioned proximate the downstream end of the conveyor near the self-scanning area, wherein the conveyor is stopped upon the at least one item being sensed by the stop sensor.

13. The self-checkout system according to claim 12, wherein the conveyor starts upon an item being placed in proximity to the start sensor.

14. The self-checkout system according to claim 12, wherein the start sensor comprises a plurality of start sensors.

15. The self-checkout system according to claim 14, wherein the plurality of start sensors are positioned one after the other in a transporting direction at the first end of the conveyor.

16. The self-checkout system according to claim 14, wherein the plurality of start sensors are spaced apart from one another a predetermined distance.

17. The self-checkout system according to claim 16, wherein a last start sensor of the plurality of start sensors is positioned such that a last item is positioned within a reaching distance of the processing area after passing the last start sensor.

18. A computer readable media having computer instructions provided thereon for allowing a computer system to perform a method for transporting items along a conveyor for a checkout system comprising:

providing a self-checkout system comprising a conveyor having an upstream end for loading at least one item for purchase and a downstream end for processing the at least one item, a processing area consisting of a self-scanning area and a bagging area positioned proximate a downstream end of the conveyor, at least one start sensor positioned proximate the upstream end of the conveyor, a user proximity sensor positioned at the self-scanning area, and a stop sensor positioned proximate to the self-scanning area;

the instructions comprising:

commencing the downstream movement of the conveyor in response to the at least one start sensor sensing a first item on the conveyor; wherein downstream movement of the conveyor continues until the at least one start sensor does not sense the at least one item;

resuming the downstream movement of the conveyor in response to a user being sensed by the user proximity sensor; and stopping the conveyor in response to the at least one item being sensed by the stop sensor.

* * * * *